US006302404B1

(12) United States Patent
Bundgart

(10) Patent No.: US 6,302,404 B1
(45) Date of Patent: Oct. 16, 2001

(54) SEALING DEVICE

(75) Inventor: Asbjörn Bundgart, Baldissero Torinese (IT)

(73) Assignee: SKF Sverige AB, Gothenburg (SE)

( * ) Notice: Subject to any disclaimer, the term of this patent is extended or adjusted under 35 U.S.C. 154(b) by 0 days.

(21) Appl. No.: 09/476,794

(22) Filed: Dec. 30, 1999

(51) Int. Cl.[7] .......... F16J 15/32

(52) U.S. Cl. .......... 277/573; 277/574; 277/551

(58) Field of Search .......... 277/571, 574, 277/573, 572, 551; 384/484, 486

(56) References Cited

U.S. PATENT DOCUMENTS 3,114,558 * 12/1963 Rhoads et al. .......... 277/571
5,553,866 * 9/1996 Heinzen .......... 277/571

FOREIGN PATENT DOCUMENTS 40 18 796 6/1990 (DE) .
2 137 702 3/1984 (GB) .

* cited by examiner

*Primary Examiner*—Chuck Y. Mah
*Assistant Examiner*—Enoch E Peavey
(74) *Attorney, Agent, or Firm*—Burns, Doane, Swecker & Mathis, L.L.P.

(57) ABSTRACT

A sealing device primarily for sealing off a slit-shaped space between two radially extending surfaces arranged about a shaft and axially displaceable relative to each other along the shaft includes a first sleeve-shaped seal part and an elastically resilient sealing body. The first sleeve-shaped part forms together with the shaft an axially open space facing the cooperating surface. The elastically, resilient sealing body has in an uncompressed state a cross-sectional area and/or a shape deviating from the area and/or shape of the axially open space. The sealing body when subjected to axial forces causing the sealing body surface and the cooperating surface to abut each other is compressed sealingly between the axial space and the cooperating surface, thereby creating a sealing engagement against the entrance of the slit-shaped space and against the shaft.

20 Claims, 3 Drawing Sheets

1
5
3
1a
2
6
4

5
9
5a
4d
4c
7
9c
7a
4b
8
9a
4
9b
4a 10
14
11c
13
11
10a
11d
12
11b
11a
12a 13
14
11
10
12

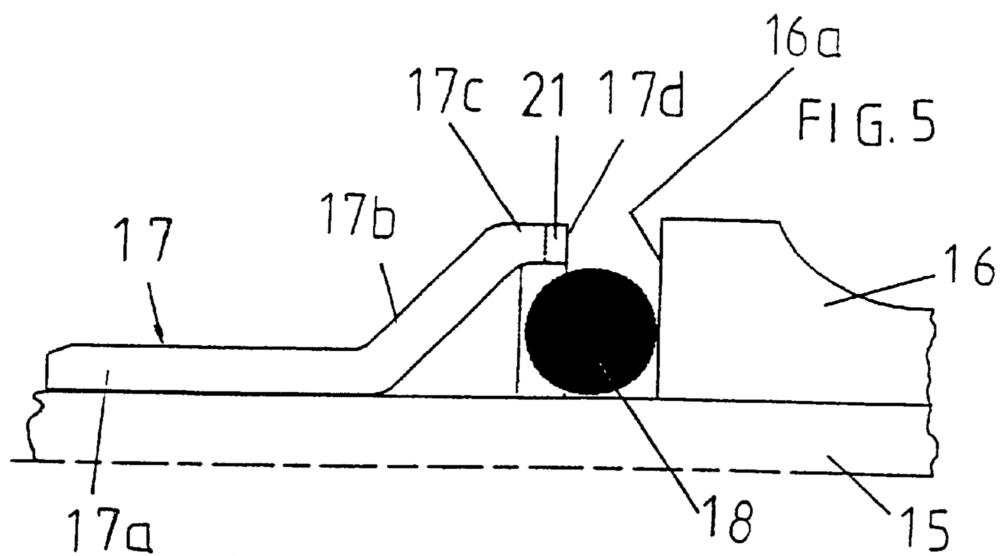
16a
17c 21 17d
FIG.5
17b
17
16
17a
18
15
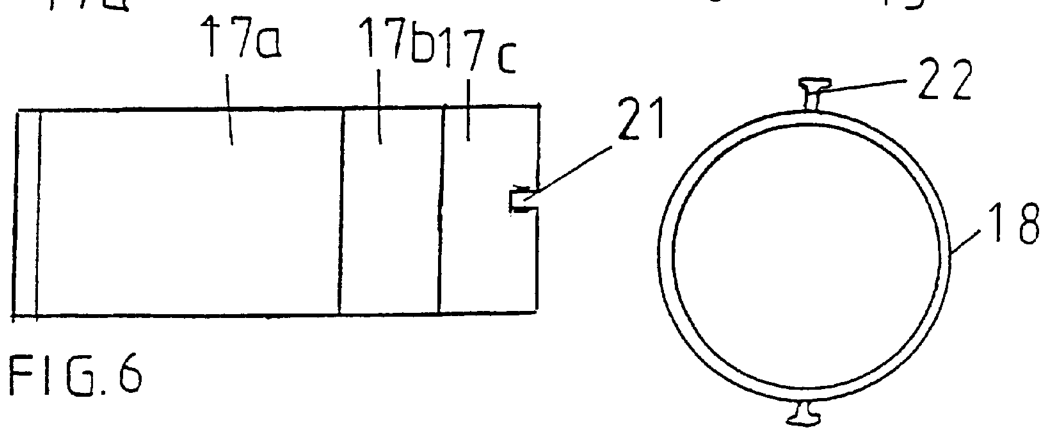
17a 17b 17c
22
21
18
FIG.6
FIG.7
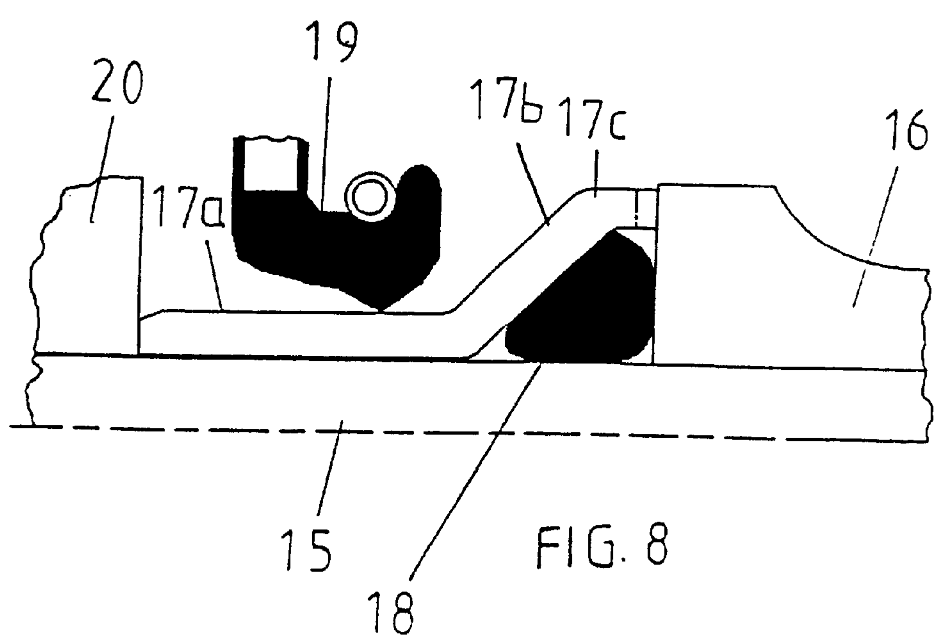
19
20
17b 17c
16
17a
15
FIG. 8
18

SEALING DEVICE

This application is based on and claims priority under 35 U.S.C. § 119 with respect to Swedish Patent Application No. 9804613-9 filed on Dec. 30, 1998, the entire content of which is incorporated herein by reference.

FIELD OF THE INVENTION

The present invention generally relates to a sealing device. More particularly, the present invention pertains to a sealing device for sealing off a slit-formed space between two radially extending surfaces arranged around a shaft and axially displaceable relative to each other along the shaft.

BACKGROUND OF THE INVENTION

Sealing devices for sealing off a slit-formed space between two radially extending surfaces arranged on a shaft are known in a plurality of different designs. These earlier designs have been rather complex and/or have required a certain skill at mounting the sealing device in a manner appropriate for giving the best possible sealing effect.

A need thus exists for a sealing device of this type which is simple in design and to relatively easy install, and yet which is very efficient.

SUMMARY OF THE INVENTION

In light of the foregoing, one aspect of the present invention relates to a sealing arrangement that includes a shaft and two radially extending surfaces arranged about the shaft in an axially displaceable manner relative to each other along the shaft, a first sleeve-shaped seal part and a sealing body. The first sleeve-shaped seal part extends around the shaft and forms together with the shaft a space facing one of the radially extending surfaces. The resilient sealing body is positioned in the space for being compressed from an uncompressed state to a compressed state. The cross-sectional area and/or shape of the sealing body is different from the cross-sectional area and/or shape of the axially open space when the sealing body is uncompressed. The sealing body is sealingly compressed within the axially open space and against the one radially extending surface when subjected to axial forces causing the sealing body to abut against the one radially extending surface to thereby create a sealing engagement against the one radially extending surface and against the shaft.

Another aspect of the invention relates to a sealing device for sealing off a slit-shaped space between two radially extending surfaces that are arranged about a shaft in an axially displaceable manner relative to each other along the shaft. The device includes a first sleeve-shaped seal part forming together with the shaft an axially open space facing one of the radially extending. The device further includes an elastically resilient sealing body having in an uncompressed state a cross-sectional area different from the cross-sectional area of the axially open space and/or a shape different from the shape of the axially open space so that the sealing body, when subjected to axial forces causing a surface of the sealing body to abut against the one radially extending surface, is compressed sealingly between the axially open space and the one radially extending surface to thereby create a sealing engagement against an entrance of the slit-shaped space and against the shaft.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein;

FIG. 5 is a side view of a portion of a shaft with a ring member to be sealed off by a third embodiment of the sealing device according to the present invention in a pre-mounting position.

FIG. 6 is a plan view of a portion of a sleeve forming part of the sealing device illustrated in FIG. 5;

FIG. 7 is a plan view of a sealing body to be used with the sleeve shown in FIG. 6; and FIG. 8 is a side view of a portion of a shaft with a ring member corresponding to FIG. 5, but with the sealing device is shown in a mounted condition.

DETAILED DESCRIPTION OF THE INVENTION

Figure 1:
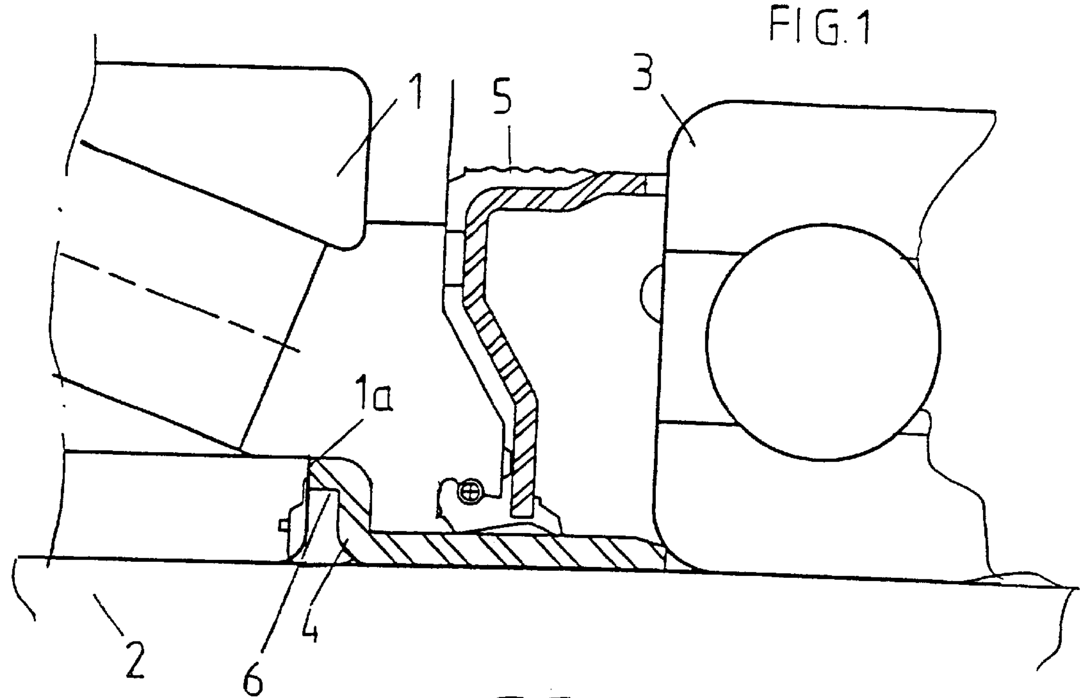
FIG. 1 is a side view of a portion of shaft with a sealed off bearing combination illustrating a first embodiment of the sealing device according to the present invention.

FIG. 1 illustrates a bearing arrangement particularly adapted for supporting a shaft, for example a shaft in a motor pump. The bearing arrangement incorporates a taper roller bearing I mounted on the shaft 2, only a small portion of which is illustrated, a deep groove ball bearing 3 mounted on the same shaft 2, and a two part sealing device 4, 5, provided between the two bearings. The two part sealing device 4, 5 is adapted to seal off the left hand side of the ball bearing 3, the space between the shaft 2 and the interior of the taper roller bearing 1, and particularly the slit-formed space between the side face of the taper bearing inner race ring 1*a*, extending radially away from the shaft, and the radial surface 4*d* on the sealing device as shown in FIG. 2.

Figure 2:
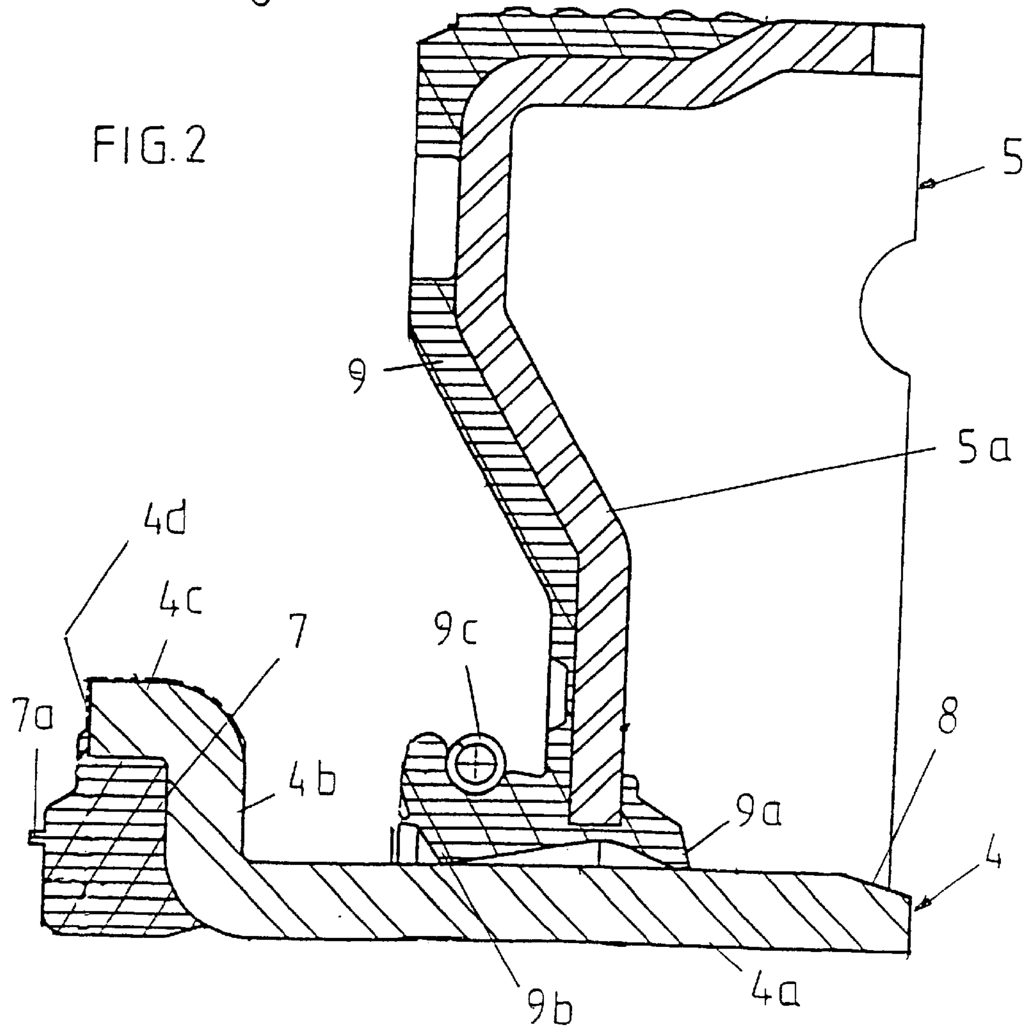
FIG. 2 is an enlarged side view of a portion of the shaft and sealed off bearing combination shown in FIG. 1.

As can be better seen in FIG. 2 which illustrates the two-part sealing device 4, 5 on a larger scale, the sealing device includes a first part 4 and a second part 5. The first part 4 is constituted by a substantially cylindrical sleeve 4*a* adapted to fit around the shaft 2, a substantially radially extending portion 4*a* provided at one axial end of the cylindrical sleeve 4*a*, and an axially extending flange portion 4*c* continuing from the radially extending portion 4*a*. The radial portion 4*a* and the axial flange 4*c* form with the shaft 2 an axially open, annular space 6 as shown in FIG. 1. The axially extending flange 4*c* terminates in the radial sealing surface 4*d* arranged to abut against the side face of the inner race ring of the taper roller bearing 1, thereby forming together with the side face of the taper bearing inner race ring a slit-shaped space.

A resiliently compressible sealing body 7 is provided in the annular space 6. The resiliently compressible sealing body 7 possesses a size and/or a shape which guarantees that it is compressed when the abutting sealing surface 4*d* is pressed into abutment with the cooperating radial surface, here the side surface of the inner taper bearing race ring. The compressed sealing body 7 sealingly contacts the entrance of the slit-shaped space and also the shaft 2, thereby under a certain pretension, preventing leakage in any direction along the shaft 2 at this annular space 6 and also through the slit-shaped space. In the embodiment shown, the sealing body 7 is provided with a projecting rim portion or projecting element 7a that is adapted to increase the contact pressure between the compressed sealing body 7 and the cooperating surface directly against the side face of the bearing ring, or in an annular groove provided in the side face of the taper bearing inner race ring.

In the embodiment shown in FIGS. 1 and 2, the axial end of the sleeve-formed part 4a of the first seal part 4 that is located opposite to the axial end at which is located the radially extending part 4b is provided with an external, annular chamfer 8. This annular chamfer 8 is adapted to engage the inner race ring of the ball bearing 3, and thereby the rounded side face of the bearing ring, thereby giving a sealing line contact against this portion of the bearing ring as shown in FIG. 1.

The second part 5 of the sealing device includes a first shield member 5a made from metal or a plastic material. The first shield member 5a is cup-shaped with a central opening. The diameter of the opening in the shield member 5a is somewhat bigger than the outer diameter of the sleeve-formed first seal part 4. One axial side of the shield member 5a is provided with an elastic and resilient lining 9. The elastic and resilient lining 9 has two inwardly projecting and axially spaced apart sealing lips 9a, 9b, both arranged to slidingly contact the external peripheral surface of the first seal part 4. With respect to the axial direction, the two sealing lips 9a, 9b are positioned on opposite sides of the radially extending adjacent portion of the first shield member 5a as seen in FIG. 2. A spring 9c encircles the axially extending portion of the lining 9 to urge the sealing lip 9b against the cooperating peripheral surface of the first seal part 4, thereby improving the sealing effect. The lining 9 is preferably affixed to the shield member 5a by vulcanization or in any other convenient manner.

Figure 3:
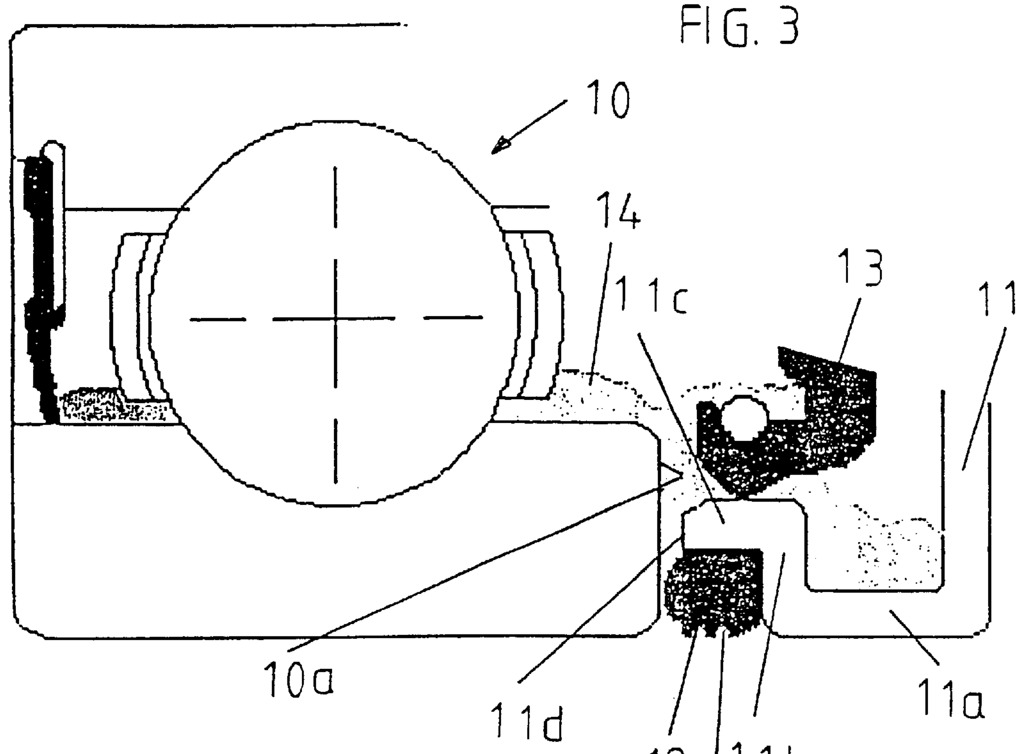
FIG. 3 is a side view schematically illustrating a ball bearing sealed off with a second embodiment of the sealing device according to the present invention before mounting.
Figure 4:
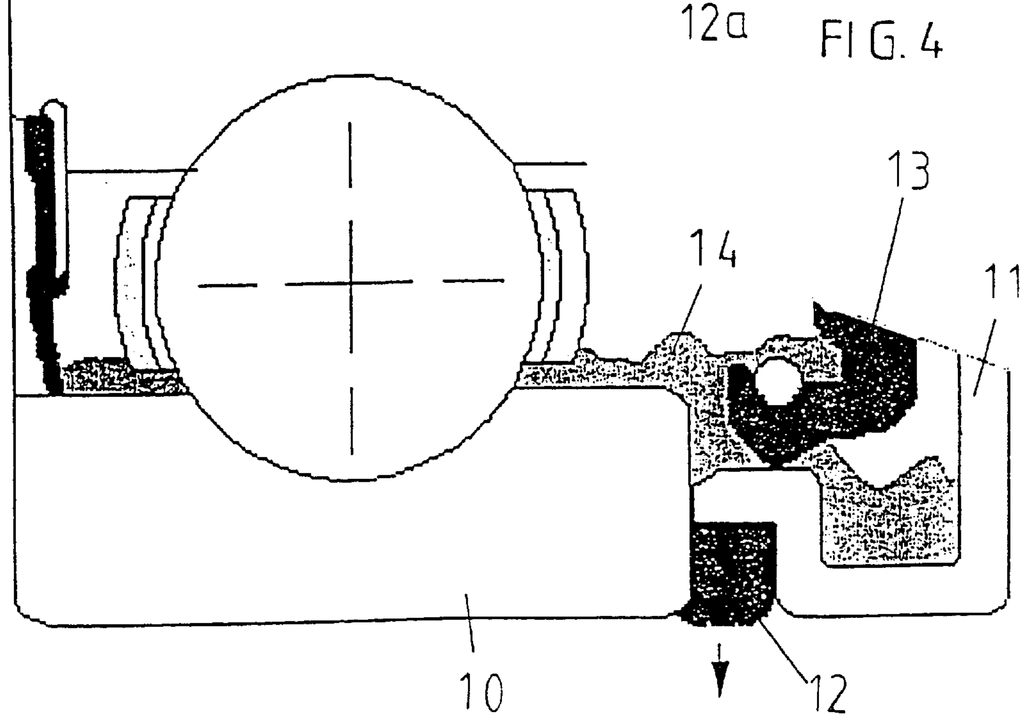
FIG. 4 is a side view schematically illustrating a ball bearing sealed off with the second embodiment of the sealing device according to the present invention after mounting.

FIGS. 3 and 4 illustrate in partial cross-sectional views a second embodiment of the invention. The drawing figures illustrate a portion of a ball bearing 10 having an inner ring, an outer ring, and a number of balls provided between the bearing rings and in rolling contact with the grooved race tracks formed in the rings. The balls are guided and kept apart by a cage. On the left hand side as seen in the drawing figures, a conventional sliding seal is provided to span the space between the inner and outer bearing rings.

A seal according to the present invention is provided at the right hand side as seen in FIGS. 3 and 4. This seal incorporates a sleeve member 11 having a substantially cylindrical portion 11a, a substantially radially extending portion 11b, and a substantially axially extending flange portion 11c. The cylindrical portion 11a is adapted to fit around the shaft (not shown). The radially extending portion 11b extends from one end of the cylindrical portion 11a and forms a continuation of the cylindrical portion 11a, while the axially extending flange portion 11c extends from and forms a continuation of the radially extending portion 11b. The radially extending portion 11b and the axially extending flange portion 11c form together with the shaft an axially open, annular space. The axially extending flange 11c ends in a radial sealing surface 11d arranged to abut against the side face of the inner race ring of the bearing 10. The radial sealing surface 11d of the axially extending flange 11c forms together with the side face of the bearing inner race ring a slit-shaped space. A resiliently compressible sealing body 12 is positioned in this annular space. The resiliently compressible sealing body 12 possesses a size and/or a shape which guarantees that the sealing body 12, when the abutting sealing surface 11d is pressed into abutment with the cooperating radial side surface of the inner bearing ring is compressed so that it sealingly contacts the entrance of the slit-shaped space and also the shaft, thereby, under a certain pretension, preventing leakage in any direction along the shaft at this annular space and also through the slit-shaped space. A lip seal 13 of any appropriate type is arranged to cooperate with the sleeve member to thereby form an additional seal. In the embodiment shown, the lip seal 13 cooperates with the outer peripheral surface of the axial flange 11c.

FIG. 3 shows the situation before mounting of the seal 11, whereas FIG. 4 shows the bearing 10 with the seal 11 mounted thereto. Thus in FIG. 3, the bearing 10 is situated on a shaft in its mounting position. Also the seal 11 is positioned on the shaft, but with its radial side face 11d facing the bearing at a small axial distance from the side face of the inner bearing ring. As can be seen from FIG. 3, the compressible, resilient sealing body 12 possesses a size and configuration by which it clearly projects outside the side face 11d of the seal. As shown in FIG. 4, the seal 11 has been pushed up in a direction to the left in the drawing figure so that the radial side face 11d of the seal 11 is positioned to abut the side face of the bearing inner ring. The sealing body 12 has thus been compressed in its space and is pressing sealingly against the side face of the bearing inner ring and also against the shaft in the manner depicted by the arrow in FIG. 4.

To increase the ability of the sealing body 12 to adapt itself to the shape of the shaft, the surface of the sealing body facing the shaft can be serrated to provide a serrated surface 12a in FIG. 3.

The bearing 10 is preferably provided with a volume or amount of lubricant 14. When the bearing is sealed off in the illustrated manner it is able to contain a sufficient lubricant volume or amount for its operating life. For maintaining the axial force required to cause the sealing body to be sufficiently compressed for sealing off the spaces, the sleeve member 11 is arrested in the position illustrated in FIG. 4 by way of a proper locking device which are known per se, such as a locking ring or the like.

FIGS. 5–8 illustrate a further form of the sealing device according to the present invention. FIG. 5 schematically illustrates a portion of a shaft 15 on which is arranged a ring 16, for example a bearing ring, having a side face surface 16a projecting or extending radially outwardly relative to the shaft. A sealing device according to the present invention is positioned to the left of the ring member 16. The sealing device according to the present invention includes a sleeve member 17 defined by a substantially cylindrical sleeve portion 17a, a sloping portion 17b and an axially extending flange portion 17c. The sleeve portion 17a is adapted to fit around the shaft 15. The sloping portion 17b extends from and forms a continuation of one axial end of the sleeve portion 17a in an upwardly and outwardly sloping manner. The sloping portion 17b continues into the flange portion 17c which extends substantially axially. The sloping portion 17b and the flange portion 17c form together with the shaft 15 an axially open, annular space. The axially extending flange 17c ends in a radial sealing surface 17d that is positioned to abut against the side face of the ring 16, thereby forming together with the side face of the ring 16 a slit-shaped space.

A resiliently compressible sealing body 18 is located in this annular space. The sealing body 18 in this embodiment is formed as an O-ring seal. The resiliently compressible sealing body 18 has a shape which guarantees that the sealing body 18, when the abutting sealing surface 17*d* is pressed into abutment with the cooperating radial surface defined by the side face 16*a* of the ring, is compressed. This compression of the sealing body 18 causes the sealing body 18 to sealingly contact the entrance of the slit-shaped space and also the shaft, thereby, under a certain pretension, preventing leakage in any direction along the shaft at this annular space and also through the slit-shaped space. In this embodiment, the axially open space formed between the sloping portion 17*b* of the seal 17, the axial flange 17*c* of the seal 17, the shaft 15 and the cooperating radial side face 16*a* of the ring 16, has a cross-sectional area greater than the cross-sectional area of the sealing body 18. In spite of this difference in area, the difference in shape between the annular space and the sealing body 18 means that the sealing body 18 will still be compressed into abutment against the radially extending surface of the ring member 16 and against the shaft 15 when the sleeve 17 is pushed up on the shaft 15 to a position where its radial surface 17*d* abuts against the side face 16*a* of the ring 16 (or vice versa). This is illustrated in FIG. 8. FIG. 8 also illustrates how a conventional lip seal 19 can be provided to cooperate with the outer peripheral surface of the sleeve 17*a*, and how the sleeve member 17 can be arrested in its mounted position by way of a locking ring 20 of an appropriate type.

In the embodiments of the sealing device according to the present invention shown in FIGS. 1 and 2, and in FIGS. 3 and 4, it is convenient to arrange the sealing body 7, 12 to be fixedly connected to the sleeve member 4, 11. This can be achieved by, for example, gluing, vulcanization or the like. This facilitates the handling of the seal because the two parts of the seal need not be handled, stored and transported separately, but rather as complete sealing units. It is thus possible to ascertain that the sealing body is always in position when the seal is to be mounted.

With the embodiment of the sealing device according to the present invention illustrated in FIGS. 5–8, this problem is solved in a different manner in that the sleeve member 17 and its axial flange member 17*c* is provided with at least two axially outwardly opening grooves 21, preferably diametrically opposed or symmetrically disposed around the sleeve as illustrated in FIGS. 5 and 6. These grooves 21 are adapted to receive projecting lugs 22 arranged on the sealing body 18 which are shown in FIG. 7.

In accordance with the present invention, the cross-sectional area and/or shape of the sealing body is different from the cross-sectional area and/or shape of the axially open space when the sealing body is uncompressed. As illustrated in various drawing figures, the sealing body possesses a dimension with respect to at least an axial dimension of the sleeve-shaped part that exceeds that of the axially open space.

The present invention thus provides a sealing device for sealing off in a rather effective manner a slit-formed space between two radially extending surfaces arranged on a shaft. The sealing device is relatively simple in construction and does not require a significant amount of skill in mounting the sealing device.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A sealing arrangement comprising:

a shaft and two radially extending surfaces arranged about the shaft in an axially displaceable manner relative to each other along the shaft to abut each other;

a first sleeve-shaped seal part extending around the shaft and forming together with the shaft an annular space facing one of the radially extending surfaces, said annular space having a cross-sectional area and a shape; and a resilient sealing body positioned in said annular space for being compressed from an uncompressed state to a compressed state, said sealing body having an area and a shape, at least one of the cross-sectional area and shape of the sealing body being different from the cross-sectional area and shape of said annular space when the sealing body is uncompressed, said sealing body being sealingly compressed within said annular space and against said one radially extending surface when subjected to axial forces causing said two radially extending surfaces to abut against each other to thereby create a sealing engagement against said one radially extending surface and against the shaft.

2. A sealing arrangement as claimed in claim 1, wherein the sleeve-shaped part has a substantially radially extending portion at one axial end, said substantially radially extending portion continuing into a substantially axially extending flange portion, the substantially radially extending portion and the substantially axially extending flange portion forming together with said shaft the annular space.

3. A sealing arrangement as claimed in claim 1, wherein one axial end of the sleeve-shaped part has an inclined portion inclined in an outward direction and continuing into a substantially axially extending flange portion, the inclined portion and the substantially axially extending flange portion forming together with said shaft the annular space.

4. A sealing arrangement as claimed in claim 1, wherein the sealing body possesses a size exceeding the size of said annular open space, said sealing body having at least one resilient portion protruding outwardly from one surface of said sealing body and outside said annular space when the sealing body is in the uncompressed state.

5. A sealing arrangement as claimed in claim 1, wherein the sealing body possesses a dimension with respect to at least an axial dimension of the sleeve-shaped part that exceeds that of the annular space.

6. A sealing arrangement as claimed in claim 1, wherein the sealing body is connected to the sleeve-shaped part by gluing.

7. A sealing arrangement as claimed in claim 1, wherein the sealing body is connected to the sleeve-shaped part by vulcanization.

8. A sealing arrangement as claimed in claim 1, wherein the sealing body is provided with projections for being detachably connected attachment means provided in the sleeve-shaped part.

9. A sealing arrangement as claimed in claim 1, including a sealing element engaging an outer peripheral surface of the sleeve-shaped part.

10. A sealing arrangement as claimed in claim 1, wherein said one radially extending surface is an end surface of an inner race ring of a bearing that also includes an outer race ring and at least one rolling element positioned between the inner and outer race rings.

11. A sealing device for sealing off a slit-shaped space between two radially extending surfaces that are arranged about a shaft in an axially displaceable manner relative to each other along the shaft to abut each other; the device comprising a first sleeve-shaped seal part forming together with the shaft an axially open space facing one of the radially extending surfaces and having a cross-sectional area and a shape, the device further comprising an elastically, resilient sealing body having in an uncompressed state a cross-sectional area different from the cross-sectional area of said axially open space and/or a shape different from the shape of said axially open space, so that the sealing body when subjected to axial forces causing the two radially extending surfaces to abut against each other is compressed sealingly between said axially open space and said one radially extending surface to thereby create a sealing engagement against an entrance of said split-shaped space and against the shaft.

12. A sealing device as claimed in claim 11, wherein the sleeve-shaped part has a substantially radially extending portion at one axial end, said substantially radially extending portion continuing into a substantially axially extending flange portion, the substantially radially extending portion and the substantially axially extending flange portion forming together with said shaft the axially open space.

13. A sealing device as claimed in claim 11, wherein one axial end of the sleeve-shaped part has an inclined portion inclined in an outward direction and continuing into a substantially axially extending flange portion, the inclined portion and the substantially axially extending flange portion forming together with said shaft the axially open space.

14. A sealing device as claimed in claim 11, wherein the sealing body possesses a size exceeding the size of said axially open space, said sealing body having at least one resilient portion protruding outwardly from one surface of said sealing body and outside said axially open space when the sealing body is in the uncompressed state.

15. A sealing device as claimed in claim 11, wherein the sealing body possesses a dimension with respect to at least an axial dimension of the sleeve-shaped part that exceeds that of the axially open space.

16. A sealing device as claimed in claim 11, wherein the sealing body is connected to the sleeve-shaped part by gluing.

17. A sealing device as claimed in claim 11, wherein the sealing body is connected to the sleeve-shaped part by vulcanization.

18. A sealing device as claimed in claim 11, wherein the sealing body is provided with projections for being detachably connected attachment means provided in the sleeve-shaped part.

19. A sealing device as claimed in claim 11, including a sealing element engaging an outer peripheral surface of the sleeve-shaped part.

20. A sealing device as claimed in claim 11, wherein said sealing body is secured within said axially open space.

* * * * *